Sept. 30, 1958      H. F. DIES      2,854,266
SWIVEL RETAINER CLIP
Filed June 2, 1955
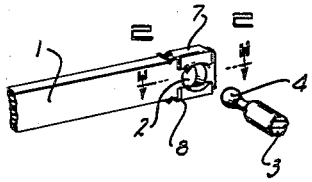
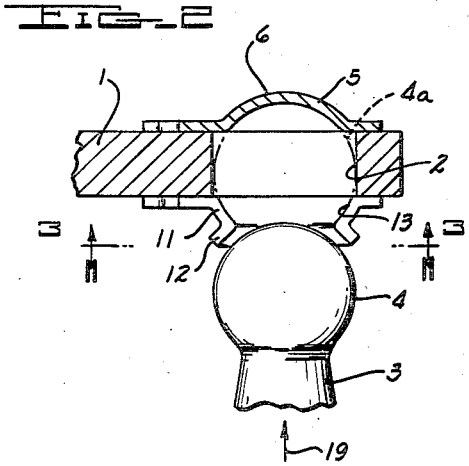
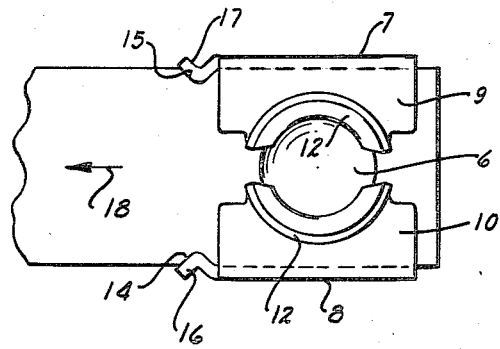
INVENTOR.
HERBERT F. DIES
BY
SMITH, OLSEN & KOTTS
ATTORNEYS

United States Patent Office 2,854,266
Patented Sept. 30, 1958

2,854,266

SWIVEL RETAINER CLIP

Herbert F. Dies, Detroit, Mich., assignor to Hurd Lock & Manufacturing Company, Detroit, Mich., a corporation of Michigan Application June 2, 1955, Serial No. 512,705

4 Claims. (Cl. 287—90)

This invention relates to a movable connection construction and particularly to a clip construction employed therein.

The movable connection construction of the present invention is employed between motion transmitting members such as throttle rods, carburetor rods, and the like. Preferably the movable connection construction includes a ball type swivel and socket joint, the swivel element being formed on one of the members and the socket being in part formed by an aperture in the other member and in part by a clip element which forms the subject matter for the present invention. Preferably the clip is of such construction that the ball type swivel element can be inserted after the clip has been seated on the apertured member.

It will be understood that there are three members employed, i. e. a swivel member, an apertured member and a clip member. The arrangement and construction of the present invention permits installation of the clip on the apertured member and subsequent installation of the swivel member in the aperture and clip. The movable connection construction is in many cases employed in closely confined spaces and it is essential in such cases that the swivel-socket joint be formed quickly and easily without undue manual manipulation and aligning of the parts during the installation operation. In the present invention the clip is installed and aligned on the apertured member without the ball member having to be first inserted in the aperture, and the ball member is subsequently inserted into the aperture without the clip having to be manually held in its position on the apertured member. As a result the installation can be effected easily even in hard to reach locations.

One object of the present invention is to provide a movable connection construction wherein there is employed an apertured member, a clip member, and a swivel member, and wherein installation of the clip member on the apertured member and installation of the swivel member in the apertured member and clip member is effected easily, quickly, and with as little manual manipulation and aligning of the parts as possible.

A more particular object is to provide a movable connection construction wherein there is employed an apertured member, a clip member, and a swivel member and wherein the clip member can be installed on the apertured member without need for first positioning the swivel member in the apertured member, and wherein the clip member can automatically be held in its final position without any manual help while the swivel member is being installed in the aperture and clip member.

Other objects of this invention will appear in the following description and appended claims, reference being had to the accompanying drawings forming a part of this specification wherein like reference characters designate corresponding parts in the several views.

In the drawings:

Fig. 1 is a perspective view of an apertured member, clip member and ball type swivel member employed in one embodiment of the invention;

Fig. 2 is a cross-sectional view taken on line 2—2 in Fig. 1; and

Fig. 3 is a view taken on line 3—3 in Fig. 2, but with an employed ball-type swivel element not shown.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a motion transmitting element in the form of a lever 1 having a circular opening 2 therein. A second motion transmitting element is provided at 3 and includes a swivel element in the form of a ball 4. Ball 4 is adapted to enter in and revolve within aperture 2, and in order to retain ball 4 within aperture 2, there is provided a clip element 5.

Element 5 is formed from a single strip of material, preferably spring steel, and includes a spherically recessed web portion 6 which conforms to the contour of ball 4. Clip 5 includes sidewalls 7, 8 and inturned end walls 9 and 10. Walls 9 and 10 are flanged away from their plane as at 11 and again at 12. Flange 12 provides an outwardly diverging mouth portion for easy admittance of ball 4 into aperture 2 and flanged portion 11 provides a spherical surface 13 for retention of the ball within the aperture after its installation.

Member 1 is provided with a pair of detent notches 14 and 15 and clip 5 is provided with detent elements 16 and 17. Assembly of the illustrated movable connection construction is effected by first sliding clip 5 onto member 1 in the direction of arrow 18 until detents 16 and 17 are engaged in notches 14 and 15 respectively. Thereafter element 3 is moved in the direction of arrow 19 until swivel member 4 assumes its dotted line position 4a (see Fig. 2).

During this movement of element 3, ball element 4 contacts diverging flanges 12 so as to spread them apart and permit entrance of the ball into the cylindrical space defined by aperture 2.

It should be noted that installation of clip member 5 on member 1 is effected without member 3 having to be first positioned in aperture 2. In many cases the illustrated movable connection construction is employed in relatively inaccessible locations. In such cases, it is difficult to simultaneously position or align more than two parts or members. With the instant construction member 5 and member 1 are positioned or brought together in their Fig. 2 positions without any manual manipulation of member 3. Member 3 is positioned in the assembly only after clip 5 is in fixed position on member 1 and it is, therefore, an easy matter to assemble the three component parts of the movable connection construction, even in closely confined and difficultly accessible locations.

Having thus described my invention, I claim:

1. A connection comprising a rod having an aperture transverse of the longitudinal axis of the rod, a clip partly encircling said rod in continuous engagement with said rod and having a web portion overlying one end of the aperture and in continuous engagement with the surface of the rod which borders said one end of the aperture, the opposite ends of said clip partially overlying the other end of said aperture and being turned away from said aperture but converging toward one another to form swivel seating surfaces, a swivel member seated in the aperture between said web portion and said seating surfaces, and cooperating detent means on said rod and said clip for securing these parts together.

2. A connection comprising a rod having a round aperture transverse of the longitudinal axis of the rod, a resilient clip partly encircling said rod in continuous engagement with said rod and having an outwardly projecting dome-like web portion overlying one end of the aperture and in continuous engagement with the surface of the rod which borders said one end of the aperture, the opposite ends of said clip partially overlying the other end of said aperture and being segments of a circle smaller in diameter than said aperture, the overlying portions of the clip ends being turned away from said aperture but converging toward one another to form swivel seating surfaces, a swivel member seated on the aperture between said dome-like web portion and said seating surfaces, and cooperating detent means on said rod and said clip for securing these parts together.

3. A connection comprising a rod having a round aperture transverse of the longitudinal axis of the rod, a resilient clip partly encircling said rod in continuous engagement with said rod and having an outwardly projecting dome-like web portion overlying one end of the aperture and in continuous engagement with the surface of the rod which borders said one end of the aperture, the opposite ends of said clip partially overlying the other end of said aperture and being segments of a circle smaller in diameter than said aperture, the overlying portions of the clip ends being turned away from said aperture but converging toward one another to form swivel seating surfaces, a swivel member seated on the aperture between said dome-like web portion and said seating surfaces, and cooperating detent means on said rod and said clip for securing these parts together, the terminal edges of said clip ends being flared apart so that after the clip initially has been secured in place on said rod the swivel member can be pressed against the terminal edges causing the ends of the resilient clip to spread apart allowing the swivel member to be inserted into its seated position.

4. A connection comprising a rod rectangular in cross section having a round aperture transverse of the longitudinal axis of the rod, a resilient clip partly encircling said rod in continuous engagement with said rod and having an outwardly projecting dome-like web portion overlying one end of said aperture and in continuous engagement with the surface of the rod which borders said one end of the aperture, the opposite ends of said clip partially overlying the other end of said aperture and being shaped as segments of a circle smaller in diameter than said aperture and substantially concentric therewith, the overlying portions of the clip ends being turned away from said aperture but converging toward one another to form swivel seating surfaces, a swivel member seated on the aperture between said dome-like web portion and said seating surfaces, and cooperating detent means on said rod and said slip for securing these parts together, said detent means including notches formed in opposite sides of said rectangular rod and detents formed in said resilient clip for resiliently snapping into said notches when said clip is passed onto said rod.

References Cited in the file of this patent

UNITED STATES PATENTS

| 748,241 | Walter | Dec. 29, 1903 |
| 2,108,344 | Miller | Feb. 15, 1938 |
| 2,189,667 | Kries | Feb. 6, 1940 |
| 2,513,637 | Herreshoff et al. | July 4, 1950 |
| 2,530,554 | Tinnerman | Nov. 21, 1950 |
| 2,589,820 | Konchan | Mar. 18, 1952 |

FOREIGN PATENTS

| 323,976 | Great Britain | Jan. 16, 1930 |
| 657,849 | Germany | Mar. 14, 1938 |
| 550,888 | Great Britain | Jan. 28, 1943 |